United States Patent Office 2,950,616
Patented Aug. 30, 1960

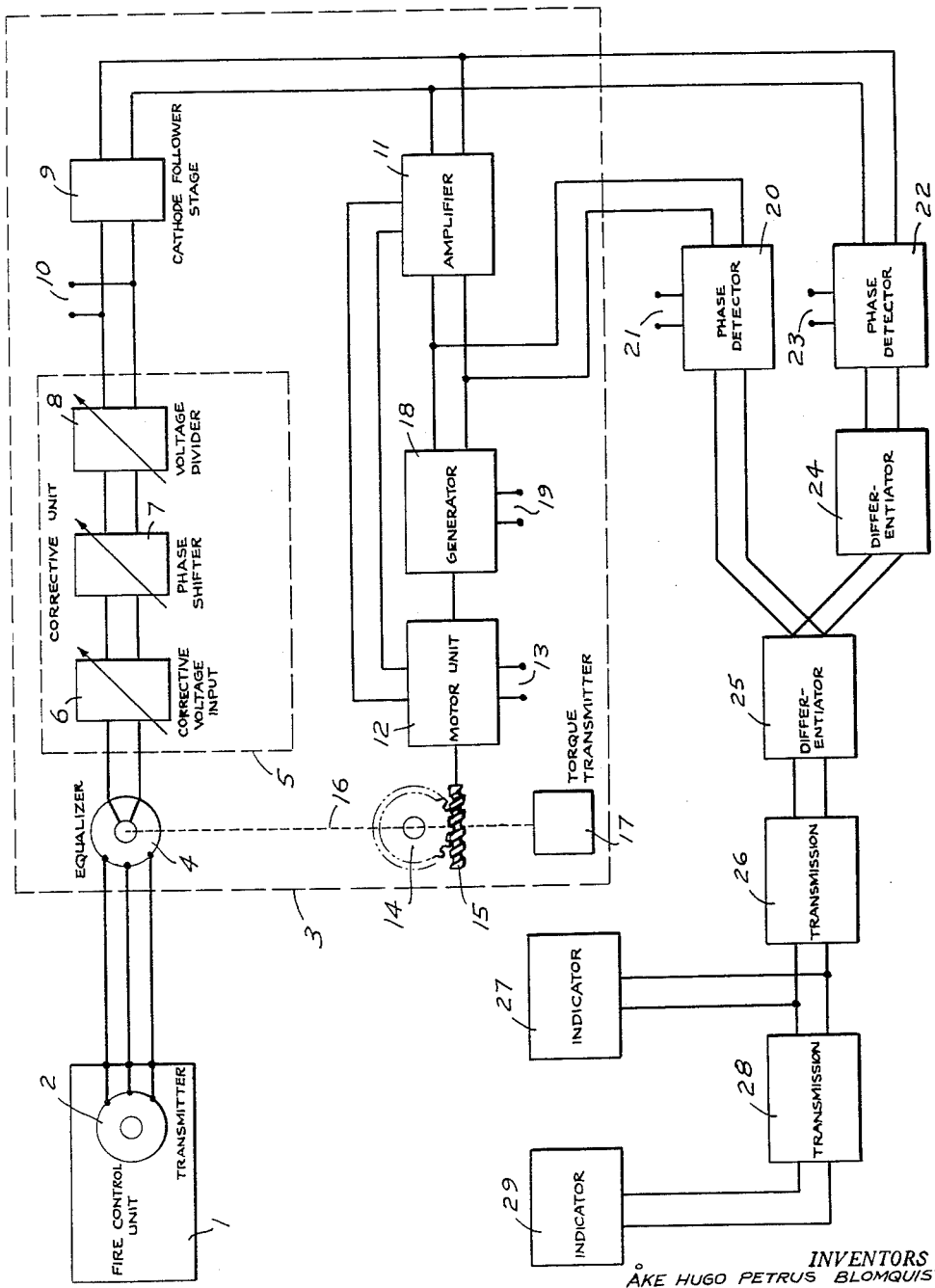

2,950,616

APPARATUS FOR DETERMINING THE PHYSICAL OUTPUT OF A SERVO-SYSTEM

Åke Hugo Petrus Blomqvist, Johanneshov, and Birger Artur Emil Qvarnström, Hagersten, Sweden, assignors to Aktiebolaget Bofors, Bofors, Sweden, a corporation of Sweden Filed Sept. 12, 1955, Ser. No. 533,556

Claims priority, application Sweden Sept. 13, 1954

5 Claims. (Cl. 73—1)

The present invention relates to an installation for supervising and checking physical magnitudes such as the output acceleration produced by a servo-system in response to signals fed to the system from a suitably controlled transmitter.

A preferred but not exclusive field of application of the invention is the determination whether a specific fire control unit is suitable for coaction with a specific servo-system of the kind used for training the barrels of guns and other heavy weapons.

Supervisory and testing installations as heretofore known for the purpose require a complete connection of the control unit with the servo-system to be tested to ascertain whether the control unit is suitable for coaction with the respective servo-system.

Checking requiring the complete installation of a servo-system by connection to the control unit such as a fire control unit is cumbersome, time consuming and presents often the problem of transporting heavy yet delicate components. It also entails the risk of damage to the servo-system by being operated from an unsuitable control unit.

When a fire control unit is connected to the servo-system of a gun, operation of the control unit effects corresponding angular accelerations of the output shaft of the system. These accelerations serve to institute corresponding elevational and/or traversing motions of the barrel. In addition to the desired accelerations of the servo-system, the control unit may cause in the servo-system unwanted accelerations of varying frequency which are likely to generate momentary and dangerous stresses in the transmission means used for transmitting the accelerations of the servo-system to the gun proper. These latter accelerations which are produced as a by-product of the desired accelerations, determine whether a specific control unit is compatible with a specific servo-system.

It is an object of the invention to provide a novel and improved installation for simulating or reproducing the accelerations experienced by a servo-system without actually connecting thereto a fire control unit or other transmitter of similar characteristics.

Still another object of the invention is to provide a novel and improved installation of the general type above referred to, the transmitter of which is readily exchangeable. This affords the advantage that the characteristics of a control unit and of a servo-system which are compatible can be rapidly and accurately determined.

A further object of the invention is to provide a novel and improved installation of the general type above referred to, which eliminates the necessity of shipping components of the installation for purpose of checking and testing and permits to carry out the checking operation in the plant and hence under favorable conditions.

Other and further objects, features and advantages of the invention will be pointed out hereinafter and set forth in the appended claims forming part of the application.

In the single figure of the accompanying drawing an installation according to the invention is diagrammatically shown by way of illustration and not by way of limitation.

The exemplified circuit system of the installation comprises a fire control unit 1. This unit has an output circuit capable of transmitting three potentials the relative values of which depend upon the momentary setting of the unit. The circuit is shown as comprising three phase windings of a synchronizing device or magslip 2. This device should be visualized as being of the type conventionally used in synchro systems and having a stator and a rotor. For purpose of description it may be assumed that the potentials set up in the circuit have the same frequency, for example, 400 cycles per second but varying amplitudes. The three phase windings are connected to an auxiliary servo-system and more specifically to the three phase windings of a second synchronizing device or magslip 4 in this system, device 4 being similar to the device 2. Device 2 of the fire control unit acts as a transmitter for the auxiliary servo-system and device 4 as an equalizer in the said servo-system. The armature winding of device 4 is connected to a corrective unit 5 including a network 6. This network introduces a corrective voltage which serves to correct an interference potential which may be generated by the capacitances between the voltage carrying wires and the connection wires between devices 2 and 4. Unit 5 also comprises a phase shifter network 7 for correcting phase displacements which may occur in the coupling between the synchronizing devices. The corrective unit finally includes a voltage divider 8 which permits to adjust the output voltage of the corrective unit to a certain value at a predetermined angle of error. The corrective unit is connected to a cathode follower stage 9 which prevents the application of the load to the units anterior of the same. A terminal connection 10 between corrective unit 5 and follower stage 9 serves to introduce a calibration signal. The cathode follower stage is connected to a servo-amplifier 11 the output of which is fed to a motor unit 12. The shaft of the motor is rotated corresponding to the signal received from amplifier 11. Motor 12 may be a two phase motor. The signal from the amplifier 11 is fed to one of the phases and an alternating voltage of the same frequency as the voltage supplied to device 2 is fed to the second phase through terminals 13. The angular position of the output shaft of motor 12 is transmitted by a worm 15, a gear 14 and a suitable linkage 16 to the armature shaft of device 4. The linkage 16 is further connected to a torque transmitter 17 which serves to prevent play in the transmission formed by gear 14 and worm 15.

Motor 12 is further connected to a velocity responsive device such as a tachometer generator 18 which supplies a voltage the value of which is controlled by the rotational speed of the shaft of motor 12. A terminal connection 19 at generator 18 serves to introduce an alternating voltage of the same frequency as the voltage fed to device 2. The output of generator 18 is fed to servo-amplifier 11 for stabilizing the servo-circuit and also to a phase detector device 20 in order to receive the superimposed signal. The phase detector device has terminals 21 for introducing a voltage of the same frequency as the voltage supplied to terminals 19.

The cathode follower stage 9 is also connected to a phase detector device 22 of the same kind as the phase detector device 20 and provided with terminals 23 for connection to the same source of voltage as terminals 21. The phase detector device 22 is connected to a differentiating device 24 which may comprise a differentiating filter network or a differentiating amplifier. The output of differentiating device 24 is fed to a second differentiating device 25 which may be of the same type as device 24. The signals generated by phase detector device 20 and the differentiating device 24 are combined in the differenating device 25 prior to being differentiated. The output of device 25 is fed to a transmission unit 26. This unit represents the servo-system as to which it is to be determined whether the respective fire control unit 1 is suitable. The unit is exchangeable and may be replaced by other units representing servo-systems having different characteristics. The transmission unit 26 is of a type such that it generates an output signal which is indicative of the accelerations which the fire control unit would have set up in the servo-system represented by the unit 26 if it had been actually connected to the system.

The transmission unit may comprise a cathode follower stage, a filter network, a second cathode follower stage and a differentiating filter all connected in cascade in the aforelisted order. The output signal of unit 26 is fed to an indicator 27 which may comprise an oscilloscope or a voltmeter. The output signal of unit 26 is also fed to a transmission unit 28 representing the same servo-system as unit 26. Unit 28 is exchangeable in the same manner as unit 26 so that both units always correspond to the same servo-system. Transmission unit 28 is designed to control a signal supplied thereto in a manner such that the transmission unit emits an output signal corresponding to the torque which the respective servo-system would have transmitted if it were connected to fire control unit 1. Unit 28 may comprise a cathode follower and phase invertor stage to the input grid of which is fed the signal from unit 26. The cathode in the stage should be visualized as being connected to one end of a branch lead containing a resistance means and a capacitance means connected in parallel. One end of a second branch lead including a resistance means and a capacitance means connected in series is connected to the anode in the stage. The two other ends of the two branch leads are joined and the junction point forms the one output connection of unit 28. The other output connection is formed by a grounded lead. The output signal of unit 28 is transmitted to an indicating device 29 which may comprise a voltmeter or an oscilloscope. As is apparent, the two units 26 and 28 must be laid out in accordance with the values obtained by tests of the servo-system which they represent. The synthesis of networks to represent given servo-systems is fully described in J. G. Truxal's book "Control System Synthesis" to which reference may be made for further information.

The circuit system of the installation as hereinbefore described, operates as follows:

Prior to the connection of fire control unit 1 to components 4 to 29 of the installation, the part of the installation represented by these components must be calibrated. This is effected by supplying to the installation, through terminals 10, a signal the data of which are known. Upon completion of the calibration, components 4 through 29 are connected to control unit 1. The corrective units 6 and 7 are then adjusted. If synchronizing devices 2 and 4 are in synchronism, no error signal will be obtained from device 4. In the event of non-synchronization an error signal is obtained which is proportional to the actual angle of deviation.

Let the positions of the devices or magslips 2 and 4 be respectively $\theta$ and $\phi$: then the error signal is proportional to $\theta - \phi$. (The unit 8 is so adjusted with respect to a definite degree of deviation that a definite potential is obtained corresponding to said deviation.) The said error signal $(\alpha\theta - \phi)$ is fed through the units 5 and 9 to the servo-amplifier 11 which will then transmit a signal to the motor 12 which reacts according to the strength of the error signal. The motor will turn the rotor of the magslip 4 in a direction to bring the error signal to zero. This turning movement is brought about by the motor 12 imparting acceleration movements to the shaft 16. Due to the fact that certain difficulties are associated with the production of a servo-system capable of following a controlling unit exactly, i.e., in the present case the fire control unit 1, there must always be a certain error signal which causes the magslip 4 to follow the magslip 2 with a certain amount of lag. Thus $\phi$ does not equal $\theta$. The auxiliary servo-system is so designed that the angle of lag does not exceed ±30°, in which range the error signal and the angle of error are proportional to one another.

The shaft of the motor 12, as a result of each control-setting induced by the fire control unit 1, will thus be given a movement with an angular velocity $\dot{\phi}$. The velocity $\dot{\phi}$ is converted into a signal with the aid of the tachometer generator 18 and the differentiating unit 25; the signal produced by unit 25 represents the acceleration $\ddot{\phi}$. In view of the lag $(\theta - \phi)$ of the auxiliary servo-system, however, the latter signal does not represent the acceleration of the fire control unit 1, $\ddot{\theta}$. A signal representing the entire acceleration will be obtained, however, if, the signal from the cathode follower stage 9 twice differentiated and the resulting signal $(\theta - \phi)$ is added to the latter signal. As shown in the drawing, this addition $((\theta - \phi) \pm \ddot{\phi})$ can be made prior to the signal being last differentiated in the device 25. The signal from the device 25 ($\ddot{\theta}$) thus represents the total amount of acceleration at the fire control unit. This signal ($\ddot{\theta}$) is fed to the transmission unit 26, and so transformed therein that the output signal from the unit represents exactly the accelerations which would have been obtained on the output side of the servo-system, represented by the unit 26, if the latter had been connected to the fire control unit 1. The signal from the unit 26 can be observed on the indicator 27. By feeding the signal from the unit 26 to the unit 28, an output signal is obtained corresponding to the torque which the servo-system would have produced if it had been connected to the fire control unit 1. The said output signal can be observed on the indicator 29. By thus observing the readings of the indicators 27 and 29 it is possible to determine whether a fire control unit is suitable for the servo-system represented by the units 26 and 28 or not.

Moment transmitter 17 eliminates, as previously mentioned, any possible play between gear 14 and worm 15 thereby avoiding a source of error in the gears.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent, is:

1. For testing a controlling means for use with a servo-system, said controlling means and said servo-system having each a synchro device, an apparatus to determine the output accelerations of said servo-system on operation of the controlling means, said apparatus comprising an auxiliary servo-system including a synchro device for connection to the synchro device of the controlling means, a motor mechanically coupled to the synchro device and controlled by the error signal produced thereby, a tachometer means driven by the motor, first and second phase detectors fed respectively by said error signal and by the signal from the tachometer means, first and second differentiating devices fed respectively from the first phase detector and the combined signal from the second phase detector and first differentiating device, the output of the second differentiating device being thereby proportional to the acceleration of the controlling means, a transmission unit fed by the second differentiating device and representative of said first mentioned servo-system whereby to produce an electrical signal proportional to the output acceleration which the controlling means would have set up in the first mentioned system had it been connected thereto, and an indicator receiving the signal from the transmission unit.

2. Apparatus according to claim 1 comprising a second transmission connected to the first unit and representative of said first-mentioned servo-system whereby to produce an electric signal proportional to the output torque which the controlling means would have set up in the first-mentioned system had it been connected thereto, and a second indicator receiving the signal from the second transmission unit.

3. Apparatus according to claim 1 and wherein the said auxiliary servo-system has an angle of lag of at most ±30°.

4. Apparatus according to claim 1 wherein the tachometer means is so connected in the auxiliary servo-system that the electric potential set up by said tachometer means stabilizes the auxiliary servo-system.

5. Apparatus according to claim 1 comprising means compensating for play in the transmission between the output side of the auxiliary servo-system and the synchro device thereof.

References Cited in the file of this patent

UNITED STATES PATENTS

| | | |
|---|---|---|
| 2,497,069 | Carpenter et al. | Feb. 14, 1950 |
| 2,666,177 | Brannin | Jan. 12, 1954 |
| 2,700,888 | Good et al. | Feb. 1, 1955 |
| 2,751,535 | Kuhnel | June 19, 1956 |
| 2,771,573 | Blomquist et al. | Nov. 20, 1956 |
| 2,794,337 | Palsson | June 4, 1957 |